US010074006B2

(12) United States Patent
Savvides et al.

(10) Patent No.: US 10,074,006 B2
(45) Date of Patent: Sep. 11, 2018

(54) METHODS AND SYSTEMS FOR DISEASE CLASSIFICATION

(71) Applicant: CARNEGIE MELLON UNIVERSITY, Pittsburgh, PA (US)

(72) Inventors: Marios Savvides, Wexford, PA (US); Thi Hoang Ngan Le, Carnegie, PA (US)

(73) Assignee: CARNEGIE MELLON UNIVERSITY, Pittsburgh, PA (US)

(*) Notice: Subject to any disclaimer, the term of this patent is extended or adjusted under 35 U.S.C. 154(b) by 0 days.

(21) Appl. No.: 15/126,828

(22) PCT Filed: Mar. 17, 2015

(86) PCT No.: PCT/US2015/021067
§ 371 (c)(1),
(2) Date: Sep. 16, 2016

(87) PCT Pub. No.: WO2015/142923
PCT Pub. Date: Sep. 24, 2015

(65) Prior Publication Data
US 2017/0091528 A1 Mar. 30, 2017

Related U.S. Application Data

(60) Provisional application No. 61/967,316, filed on Mar. 17, 2014.

(51) Int. Cl.
G06K 9/00 (2006.01)
G06T 7/90 (2017.01)
(Continued)

(52) U.S. Cl.
CPC ....... *G06K 9/00147* (2013.01); *G06K 9/0014* (2013.01); *G06K 9/4604* (2013.01);
(Continued)

(58) Field of Classification Search
CPC .................................. G06K 9/00; G06T 7/00
(Continued)

(56) References Cited

U.S. PATENT DOCUMENTS 5,874,266 A * 2/1999 Palsson ................ C12N 5/0087
424/577
8,849,006 B2 * 9/2014 Arbuckle ............... G02B 21/10
382/133
2008/0212868 A1 9/2008 Ramoser et al.

OTHER PUBLICATIONS

International Search Report and Written Opinion of the International Searching Authority for PCT Application PCT/US2015/021067 dated Jul. 20, 2015.
(Continued)

Primary Examiner — Abolfazl Tabatabai
(74) Attorney, Agent, or Firm — Michael G. Monyok; David G. Oberdick

(57) ABSTRACT

This invention describes methods and systems for use of computer vision systems for classification of biological cells as an aid in disease diagnostics. More particularly the present invention describes a process comprising employing a robust and discriminative color space which will help provide segmentation of the cells; employing a segmentation algorithm, such as a feature-based level set, that will be able to segment the cells using a different k-phase-segmentation process, which detect for example, if a while blood cell occurs for segmenting the internal components of the cell robustly; employing a combination of different type of features including shape, texture, and invariant information, and employing a classification step to associate abnormal cell characteristics with disease states.

5 Claims, 10 Drawing Sheets

(51) Int. Cl.
 *G06K 9/46* (2006.01)
 *G06T 7/00* (2017.01)
 *G06T 7/187* (2017.01)
 *C12Q 1/68* (2018.01)
 *H04N 5/232* (2006.01)

(52) U.S. Cl.
 CPC .......... *G06K 9/4652* (2013.01); *G06T 7/0012* (2013.01); *G06T 7/187* (2017.01); *G06T 7/90* (2017.01); *G06T 2207/10024* (2013.01); *G06T 2207/10056* (2013.01); *G06T 2207/20081* (2013.01); *G06T 2207/30024* (2013.01); *H04N 5/23293* (2013.01)

(58) Field of Classification Search
 USPC .................................. 382/128–134; 435/6.1
 See application file for complete search history.

(56) References Cited

OTHER PUBLICATIONS

Belkacem-Boussaid, Kamel et al. "Extraction of Color Features in the Spectral Domain to Recognize Centroblasts in Histopathology." Conference Proceedings 2009 (2009): 3685-3688. PMC. Web. Nov. 1, 2017.

\* cited by examiner

METHODS AND SYSTEMS FOR DISEASE CLASSIFICATION

CROSS-REFERENCE TO RELATED APPLICATIONS

This application claims the benefit under 35 U.S.C. § 119 of U.S. Provisional Application Ser. No. 61/967,316, filed on Mar. 17, 2014, which is incorporated by reference herein in its entirety.

STATEMENT REGARDING FEDERALLY SPONSORED RESEARCH

Not Applicable.

BACKGROUND OF THE INVENTION

The field of the invention relates generally to disease diagnostics. More particularly, the invention relates to methods and systems for analyzing images of biologic cells to aid in identifying and classifying disease. In one embodiment of the present invention, the color space of an image of blood cells is transformed to create an alternate presentation of the image that more clearly identifies pathologic cells.

Pathology is an essential tool used in the diagnosis of various diseases. Typically, a licensed pathologist will observe a biological sample under a microscope to make a determination of whether a disease is present in the patient. The diagnosis is dependent on the skill and experience of the pathologist, the stage of disease progression, and the quality of the image captured. While pathology is commonly used, it is relatively expensive compared to other medical costs and not readily ordered in the early stages of a disease. For example, a patient who has developed cancer may exhibit symptoms consistent with more common diseases, such as the flu. Only when the patient has not responded to treatment of the symptoms might a treating physician perform a tissue analysis. However, in the example of a cancer patient, early detection improves the chance of success for treatment. In addition, the pathologist has a limited ability to quantify the abnormalities present in a sample, which could be critical in borderline cases.

To overcome these limitations, a number of approaches have been taken to perform computer vision-based and machine learning-based analysis of biologic cells as an aid in disease diagnostic. These methods seek to segment, or isolate, cell populations as a first step, then classify individual cells through further analysis as being abnormal or indicative of a disease. To perform computer vision-based analysis, various parameters of the image, such as color, intensity, or hue, are extracted from an image for processing by a computer.

As with most computer-vision based system, accurate segmentation is a critical step before analyzing the image. Image segmentation groups pixels within an image into regions or categories, where each region can correspond to an object in the image. Each pixel of a region has similar characteristics, or features, as other pixels in the region.

One of the simplest, and most predominant, cell segmentation approaches is intensity thresholding. In this image processing technique, global or local information in an image is utilized to compare the intensity of pixel to a threshold value. If a pixel is above the threshold, it is assigned to one category. Pixels below the threshold are assigned to a second category.

The intensity thresholding approach makes use of the assumption that cells and non-cells (background) have starkly different intensities and can be divided into separate categories. In practice, the illumination, color representation, and other image characteristics are dependent on the image capture device and will differ depending on the type and quality of the capture device used. Due to these differences, the intensity of cells and non-cells can be muted and the thresholding intensity assumption breaks down. As a result, the thresholding approach used alone gives poor segmentation results.

Instead of using the absolute intensity property alone, feature-based segmentation using filtering is also a common approach in cell segmentation. In one approach, filtering makes use of additional image characteristics to compare pixel intensity changes that can be used to identify the edge, for example, of an object in the image. Cells not separated by an edge are grouped into the same category. This approach provides useful cues but cannot give perfect cell segmentation results without further enhancements.

In addition to differential filters, which identify differences between two regions of an image, morphological filters using nonlinear operators such as erosion, dilation, opening and closing are also useful for cell segmentation. This approach is useful to enhance the image structure for segmentation by grouping neighboring pixels that have similar features. Region based segmentation using some primary knowledge or assumptions about initial points (seeds) and region growing is also very popular. Some common methods that use this approach are the hierarchical split-and-merge and watershed methods.

Another well-known approach is based on using deformable models, which are formulated as either implicit or explicit. Level sets, which are one of the most popular methods in this category, are able to handle topological changes and are thus useful for cell segmentation and cell tracking. However, most of the current approaches make use of global information when considering the entire image as a whole and do not give much consideration to the special features of blood cells, e.g that two different colors can be represented in the same cell, especially white blood cells.

Some approaches use a more targeted analysis of areas of color in a cell. Color space or color modeling is defined as a model that is able to represent color numerically in terms of three or more coordinates. Some common color spaces, such as RGB, YIQ, HSV, Lab, have been effectively used in many computer vision applications. However, such color spaces were not particularly designed for medical images and it shows some weakness when displaying a white blood cell, as shown in FIG. 1.

In FIG. 1, the first column shows the original image. The second column shows the image adapted to the HSI color space, in which the white blood cells are presented similarly to the background, creating little differentiation between the two. The third column shows the image in the RGB color space and the white blood cell is presented in a similar color to the red blood cell, which leads to difficulty in separating the two. Hence, finding an appropriate color space for peripheral blood images to present the white blood cells as a distinct component of the image is an importance task for pathological analysis of blood cells.

In addition to the drawbacks associated with current analysis techniques, most blood cell analysis methods and systems have concentrated on segmentation with the assumption that white blood cells are already present in the peripheral blood image. These methods have worked well on the images where white blood cells are present; however, the approaches experience difficulties when there are only red blood cells in the image, as shown in the first two columns of FIG. 2. For example, when no white blood cells are present, only two regions of the image, background and red blood cells, have to be separated. On the other hand, when white blood cells are present, three regions of the image, background, red blood cells, and white blood cells, have to be considered.

Given the drawbacks of current cell segmentation techniques, it is difficult to isolate and identify individual cells in an image. It would therefore be advantageous to develop a system and method of transforming a blood smear image to provide for a clear differentiation of targeted areas, enabling accurate segmentation of individual cells. With proper segmentation of the cells, classification of characteristics of individual cells can be used in disease diagnosis. While one embodiment of the present invention applies to blood cell images, the invention can be applied to images of other biologic cells.

SUMMARY OF THE INVENTION

Described herein are methods and systems that incorporate computer vision and machine learning techniques for classification of biological cells, which can be used alone or as an aid in disease diagnostics. More particularly, the present invention describes an approach comprising: (a) employing a robust and discriminative color space to transform a blood smear image, which will help aid in the segmentation of the blood cells in the image; (b) segmenting the cells in the image, wherein the process can further detect if a while blood cell is present and if so, segmenting the internal components of the white blood cell; (c) characterizing the cells and other components through a combination of different type of features including shape, color, texture, and invariant information, and (d) classifying cells by associating abnormal cell characteristics with disease states.

DETAILED DESCRIPTION OF THE INVENTION

Figure 3:
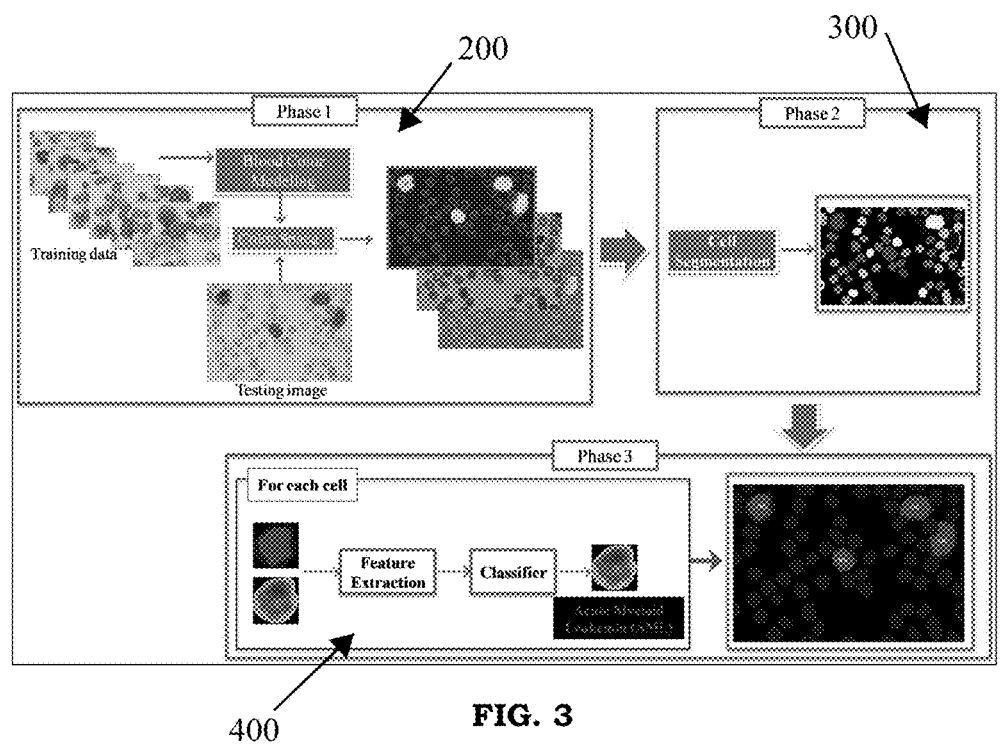
FIG. 3 is a flow chart showing the method of the present invention according to one embodiment.
Figure 15:
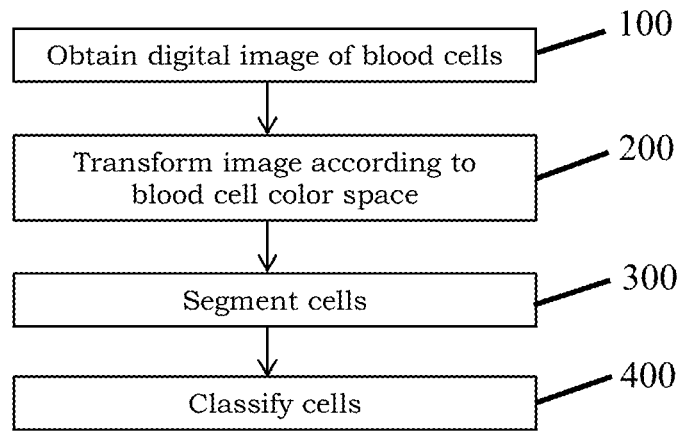
FIG. 15 is a flowchart depicting the overall method of analyzing an image according to one embodiment of the present invention.
Figure 16:
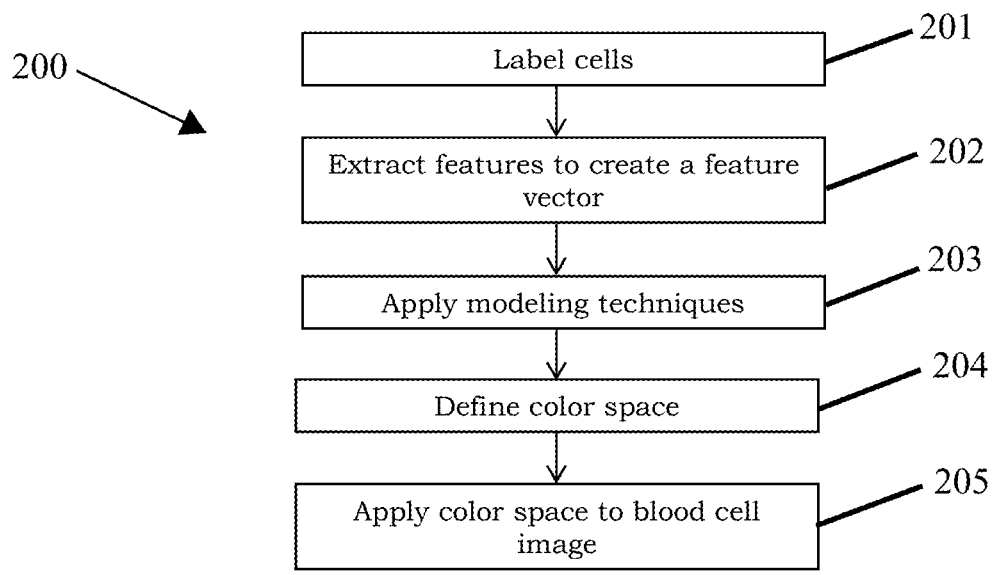
FIG. 16 is a flowchart providing additional process steps for transforming an image to a blood cell color space.
Figure 17:
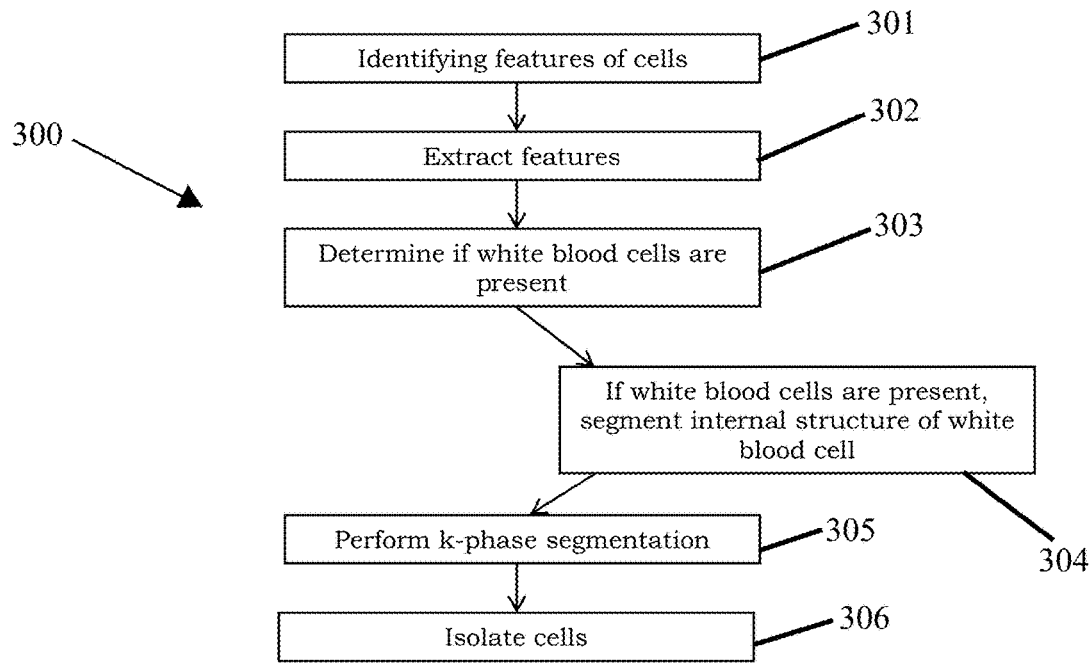
FIG. 17 is a flowchart outlining the process of segmenting cells in an image.
Figure 18:
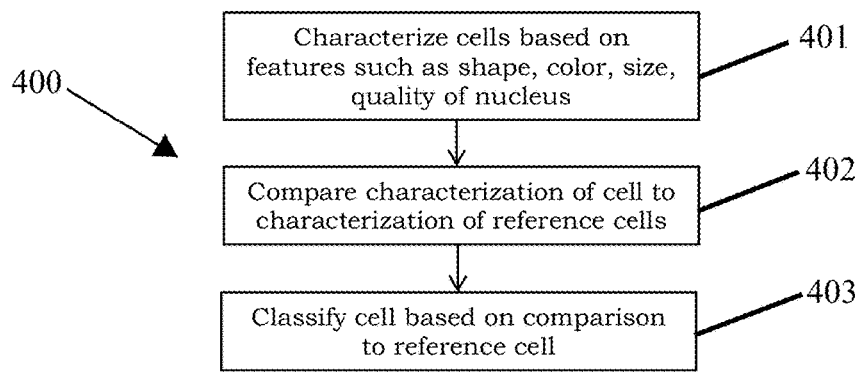
FIG. 18 is a flowchart identifying the process of classifying the cells.

Described herein are methods and systems that utilize computer vision and machine learning techniques for classification of biological cells as an aid in disease diagnostics. In the preferred embodiment, the method is generally comprised of obtaining an image of blood cells; transforming the image to a color space that presents a high level of differentiation between cells, the background, and components of interest; segmenting, or isolating, individual cells and cell structures in the transformed image; identifying and scoring a set of features of the isolated cell; and classifying each isolated cell with reference to a database of known cell types based on the feature set. A flowchart of the basic method of the preferred embodiment is shown in FIG. 15. More detailed flowcharts of each step are shown in FIGS. 16-18. In addition, a graphical representation of the method is shown in FIG. 3.

Referring to FIG. 15, at step 100, obtaining an image of blood cells is accomplished with any device capable of capturing an image containing data of various image parameters such as color, luminosity, hue, and intensity, to name a few. The device can be a digital camera that captures the image directly, or it can be a scanner that creates an image from a traditional photograph. To present the blood cells for capture, a thin layer of blood is smeared on a microscope slide. The blood film, or peripheral blood smear, can also be stained according to techniques known in the art.

With respect to step 200, a color space is developed and applied to the raw image to create a transformed image in a manner that highlights the distinction between the cells, cell parts such as the nucleus, and the background. Color space or color modeling is a model that is able to represent color numerically in terms of three or more coordinates. Some common color spaces, such as RGB, YIQ, HSV, and Lab, have been effectively used in many computer vision applications. However, these color spaces are not particularly designed for blood cell analysis, which is represented in a very special color range.

Figure 4:
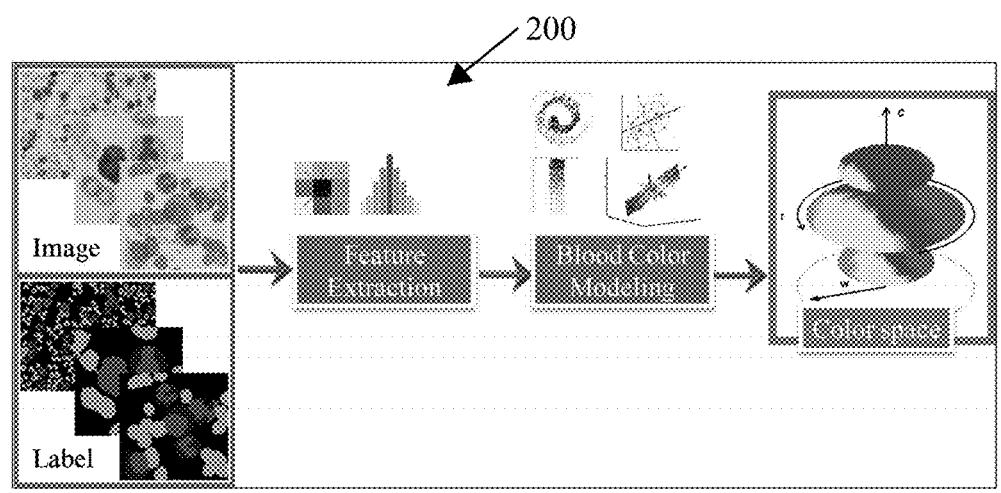
FIG. 4 is a flowchart depicting the transformation of an image to a specific color space for blood cells according to the present invention.

Because known color space models are inadequate when used for blood cell images, the system and method of the present invention utilize a color space developed specifically for blood cells. Referring to FIG. 16, transforming the image according to the blood cell color space is comprised of the following: cells or regions contained in the image are labelled at step 201; once a component or cell is labeled, features are extracted and a feature vector is created of the labelled regions at step 202; based on the feature vector, known color modeling techniques are applied at step 203 in which the color space is optimized to transform the image, wherein the various models are used to assign a weight to particular characteristics of the image data for further analysis at step 204; and the color space is applied to the captured image at step 205. Optimization of the color space is accomplished through machine learning techniques, where an image is compared to a training dataset. As an example of the optimization, the RGB data in an image may be presented as 38% of the transformed image data, with other color spaces representing the remainder. FIG. 4 is a graphical representation of the process of deriving the blood cell color space.

By way of further detail, at step 203, the blood cell color space is built upon various blood cell color modeling techniques and can be based on the color, intensity, hue, saturation, and other image characteristics. In addition, the models can include discriminant models such as PCA (Principal Component Analysis), Linear Discriminant Analysis (LDA), Locality Preserving Projection (LPP), or Local Fisher Discriminant Analysis (LFDA), to name a few. Alternatively, a generative model such as Gaussian Mixture Model (GMM), or Naive Bayes can be used. To derive a color space for a particular capture device, free dictionary learning is one appropriate machine learning approach for deriving a blood cell color space.

Applicant uses the term color space to denote part of a process that enhances an image for the segmentation and classification steps. However, the term color space encompasses more than just visible light. Any features or characteristics of the cells or image data can be used to define the "color space" if it improves the ability to segment and classify cells.

As with other machine learning techniques, a training dataset is used to learn properties of a known dataset and applying them to new data. In the present invention, the training dataset used to create the blood cell color space consists of different types of blood cells such as normal red blood cells, normal white blood cells, neutrophikles, shistocytes, leukemia cells, and other abnormal blood cells. In the preferred embodiment, the training data is collected from different sources and is captured with different image capture devices.

In order to meet the goal of the color space being independent of the device used to capture the image and being robust against color dependence, the feature vector, which facilitates subsequent learning steps, can be a combination of color information, energy, entropy, gradient and histogram data extracted from selected pixels. A pixel P is selected for feature extraction if its surrounding neighbors are labeled with the same label as the pixel P. Color information in RGB (Red Green Blue), HSV (Hue, Saturation, Lightness), Lab (Lightness and the color-opponent dimensions) can be used. The energy and entropy are defined by the difference between the central regions and its neighboring regions.

Figure 1:
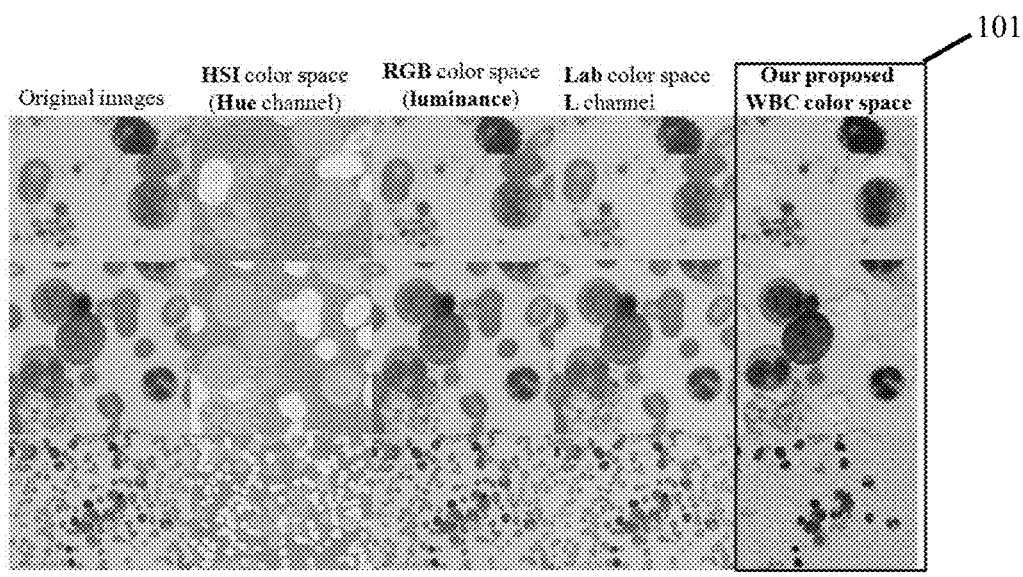
FIG. 1 depicts the presentation of an image according to several pre-designed color spaces and the color space of one embodiment of the present invention.
Figure 2:
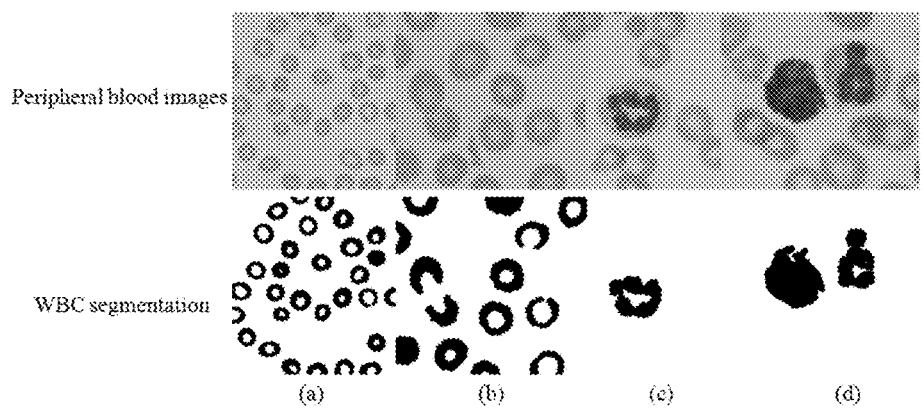
FIG. 2 shows images of blood cells in the top row as contrasted to examples of cell segmentation when the peripheral blood images contains only red blood cells or contains both red blood cells and white blood cells, according to techniques known in the art.

Once the color space is defined, the original blood cell image is transformed to provide a high level of distinction between the regions of interest in the image. As shown in FIG. 1, red blood cells and white blood cells have some particular characteristics that are not well presented in the color space of the prior works. The first four columns of FIG. 1 show images according to various existing techniques. In contrast, the color space of the present invention, depicted in the last column 101 of FIG. 1, shows improved contrast between different cells and the internal components of white blood cells. For example, multiple nuclei are shown in a few of the white blood cells, which are the larger cells. Moreover, the nucleus of the white blood cell is highly visible with respect to the cytoplasm of the cell.

In the first four columns of FIG. 1, multiple nuclei cannot be readily observed due to the low contrast levels. Many diseases are manifested as abnormalities in the nucleus, so it is critical to clearly present this region of the image. In contrast, the nucleus is barely visible in the image of the white blood cells in the second column, which represents the HSI color space.

After defining the color space, the cells are segmented at step 300. FIG. 17 is a flowchart depicting one embodiment of the segmentation process. Steps 301 and 302 relate to feature extraction to be used in connection with segmentation algorithms. These steps can be performed separately or as part of the prior color space feature extraction process.

Before segmenting the blood cells, a white blood cell detection process is performed at step 303 by scanning the entire image horizontally and vertically to generate a histogram output. The histogram of 256 bins of each horizontal and vertical slide is then computed. For an image that has only red blood cells, there will be two peaks in the slide. If red blood cells and white blood cells are present, there will be three peaks. As a result, a white blood cell is proven to be present in a peripheral blood image if three-peak slides continuously exist. The location of the white blood is determined as the intersection between three-peak horizontal slide and three-peak vertical slide. Using such white blood cell detection, a group of mixed white blood cells can easily be expressed. If white blood cells are detected, the white blood cell as well as the internal structure of the cell will be segmented (steps 305 and 304, respectively).

Figure 9:
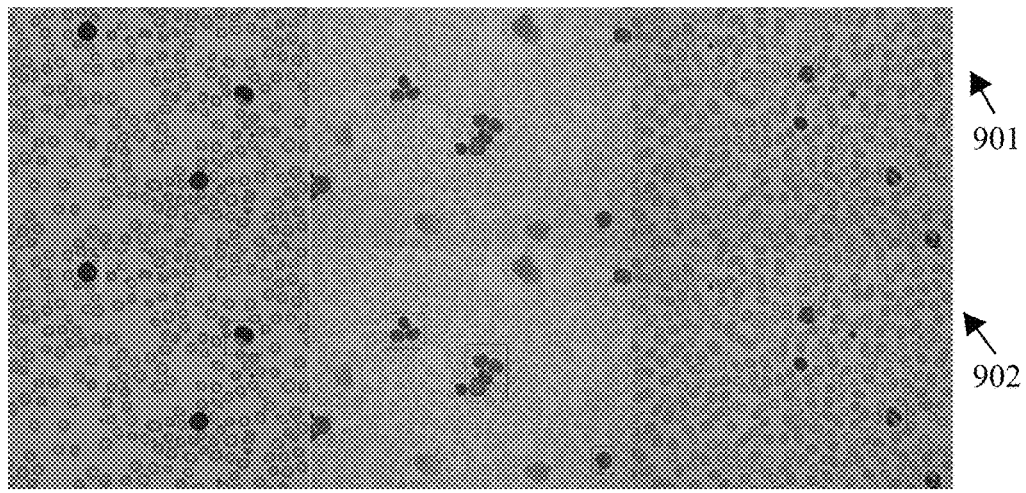
FIG. 9 depicts the results of white blood cell detection, wherein the top row shows the original image and the bottom row shows the same image with white blood cells highlighted.

FIG. 9 shows the results of this white blood cell detection process. For example, images without white blood cells detected are shown in row 901. Row 902 shows the same images, but with the white blood cells detected and highlighted with a superimposed box. Segmenting individual white blood cells in a group of mixed cells allows for further analysis of the internal structure of the cell, which can provide key markers of diseases such as leukemia.

After white blood cells are detected, a combination of global analysis and local analysis of cell features is used to enable segmentation of the cells into distinct populations at step 305. The global information is identified based on a piecewise constant approximation which assumes image intensity is homogeneous in each region. The local image intensities are described by Gaussian distributions. The local fitting force and global fitting force are complementary and are utilized in different manners depending on characteristics of the cell feature that is being analyzed. For example, (1) when the contour is close to an object boundary, the local force is used in order to attract the contour toward the object and then stops at the boundary, and (2) when the contour is far away from an object boundary, the global force is used to overcome the weakness of local binary fitting approach. The global and local fitting energy functions are defined, respectively, as:

$$F^G(c_1, c_2, \varphi) = \lambda_{11}\int_\Omega (c_1-u_0)^2 H(\varphi)dxdy + \lambda_{12}\int_\Omega (c_2-u_0)^2(1-H(\varphi))dxdy$$

$$F^L(f_1, f_2, \varphi) = \lambda_{21}\int_\Omega K_\sigma(f_1-u_0)^2 H(\varphi)dxdy + \lambda_{22}\int_\Omega K_\sigma(f_2-u_0)^2(1-H(\varphi))dxdy$$

To derive a smooth contour, the zero-level set regularization is used and defined as:

$$\text{Length}(\varphi) = \int_\Omega \delta(\varphi)|\nabla\varphi|dxdy.$$

Furthermore, in order to preserve the accurate computation and stable level set evolution, a level set regularization term defined as $$P(\varphi) = \int_\Omega \frac{1}{2}|\nabla\varphi - 1|^2 dxdy$$

is used. Thus, the energy functional is defined using four terms as follows:

$$F(c_1, c_2, f_1, f_2, \varphi) = \frac{\alpha}{\alpha+\beta}F^{Global}(c_1, c_2, \varphi) + \frac{\beta}{\alpha+\beta}F^{Local}(f_1, f_2, \varphi) + \nu\,\text{Length}(\varphi) + \mu\,P(\varphi)$$

By making use of the advantages of both local and global information, the motion of the contour is driven by the mixed fitting force. Two complimentary fitting forces are needed to deal with the problem of using the global characteristic (intensity inhomogeneity, weak object boundary) and the problem of utilizing the local information (initial condition dependence). The parameters α and β can be defined by entropy maximization.

As the second part of the process, the local information is defined as a combination of two dimensional (2D) intensity histograms, Gradient Vector Flow, and energy features. The energy feature is constructed using both the Gradient of Gaussian (GoG) and Laplacian of Gaussian (LoG) at different kernels. In the preferred embodiment, the 2D Gaussian is defined as $$G(K_\sigma^x, K_\sigma^y) = \frac{1}{2\pi\sigma^2}\exp\left(\frac{-((K_\sigma^x)^2 + (K_\sigma^y)^2)}{2\sigma^2}\right).$$

The 2D GoG operator is defined as:

$$\nabla G(K_\sigma^x) = \frac{K_\sigma^x}{\sigma^2}\frac{1}{2\pi\sigma^2}\exp\left(\frac{-((K_\sigma^x)^2 + (K_\sigma^y)^2)}{2\sigma^2}\right)$$

-continued $$\nabla G(K_\sigma^y) = \frac{K_\sigma^y}{\sigma^2}\frac{1}{2\pi\sigma^2}\exp\left(\frac{-((K_\sigma^x)^2 + (K_\sigma^y)^2)}{2\sigma^2}\right)$$

while the 2D LoG operators are defined as:

$$\nabla G(K_\sigma^{xx}) = \frac{(K_\sigma^x)^2 - \sigma^2}{\sigma^4}\frac{1}{2\pi\sigma^2}\exp\left(\frac{-((K_\sigma^x)^2 + (K_\sigma^y)^2)}{2\sigma^2}\right)$$

$$\nabla G(K_\sigma^{yy}) = \frac{(K_\sigma^y)^2 - \sigma^2}{\sigma^4}\frac{1}{2\pi\sigma^2}\exp\left(\frac{-((K_\sigma^x)^2 + (K_\sigma^y)^2)}{2\sigma^2}\right)$$

$$\nabla G(K_\sigma^x, K_\sigma^y) = \frac{K_\sigma^x K_\sigma^y}{\sigma^4}\frac{1}{2\pi\sigma^2}\exp\left(\frac{-((K_\sigma^x)^2 + (K_\sigma^y)^2)}{2\sigma^2}\right)$$

The Gradient Vector Flow (GVF) is a feature preserving diffusion of gradient information. The GVF feature is defined $V(x,y,z)=[u(x,y,z),v(x,y,z),w(x,y,z)]$ such that the following energy functions are minimized.

$$\mu\nabla^2 u - (u-f_x)|\nabla f|^2 = 0, \mu\nabla^2 v - (v-f_x)|\nabla f|^2 = 0,$$

$$\mu\nabla^2 w - (w-f_x)|\nabla f|^2 = 0 \text{ where } \nabla f = (f_x, f_y, f_z)$$

The 2D histogram of an M×N image with L gray levels (L=256 for a grayscale image) is defined as a co-occurrence matrix L×L where L is a 1D histogram. For each image pixel at spatial co-ordinate (m, n), with its gray level specified by I(m, n), it considers two neighboring pixels at locations of (m+1, n), (m, n+1). Let $O_{ij}$ be the (i, j)$^{th}$ element of the co-occurrence matrix, $$O_{ij} = \sum_{m=1}^{M}\sum_{n=1}^{N} X_{mn},$$

where $X_{mn}=1$ if I(m,n)=i and I(m+1,n)=j and I(m,n+1)=j. From the gray level i to the gray level j, the desired transition probability is $$p_{ij} = \left(\sum_{l_1=1}^{L}\sum_{l_2=1}^{L} O_{l_1 l_2}\right)^{-1} O_{ij}.$$

As previously stated, given an unknown testing image, it must be determined whether white blood cells are present. In alternative embodiments, white blood cell detection is performed by dividing the testing image into a set of regions and performing a feature extraction for each region. The feature, which can be a combination of histogram, Histogram of Orientated Gradient (HOG), 2D directional Gabor, energy, entropy and color information, is computed for each region. The feature distance between one region and its surroundings is then computed and used as a feature for classification. Each region is classified as either consisting of white blood cell or not. During training, a model and hyperplane are built using the same training data used to create the unique blood cell color space. At testing, the feature distance between one region and its surrounding is first computed and projected onto the hyperplane and training model, the region is then classified as a white blood cell or a red blood cell.

Figure 5:
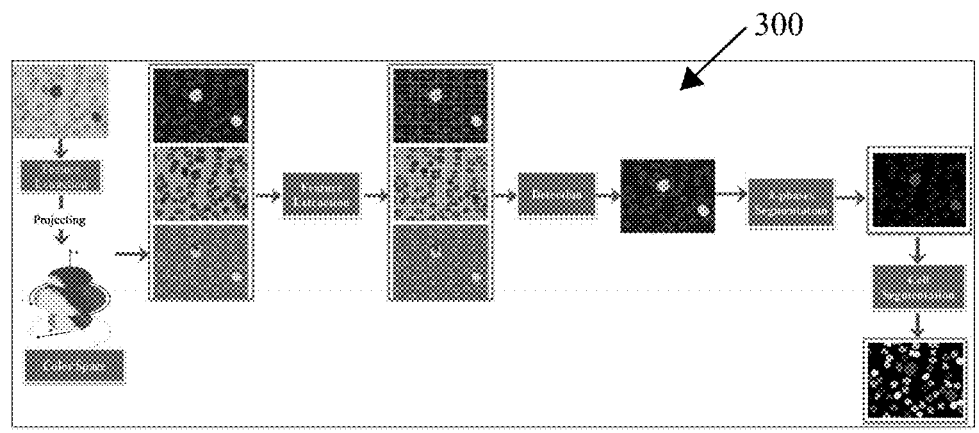
FIG. 5 is a flowchart showing the blood cell segmentation step of the method of one embodiment of the present invention.

For images containing only red blood cells, the image is segmented by 2-phases energy-based segmentation. For images containing both white blood cells and red cells (salad-mixed), the image is segmented by either 3-phases or 4-phases energy based segmentation. The k-phases segmentation at step 305 is chosen as the one which obtains minimum energy. The graphical representation of the blood cell segmentation step 300 is shown in FIG. 5. The k-phases segmentation step 305 is performed by repeating the 2-phases energy-based segmentation approach. For example, 4-phases segmentation is implemented by first employing the 2-phases. For each region, the 2-phases approach is reapplied.

Figure 7:
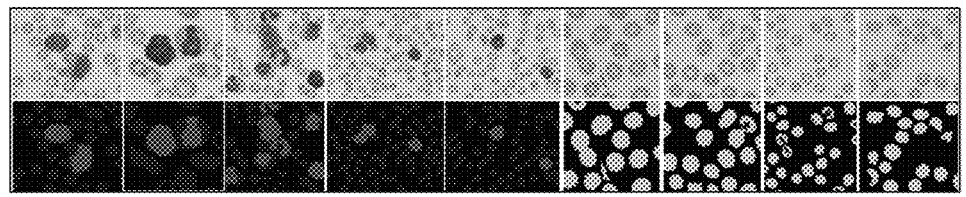
FIG. 7 depicts the results of the segmentation step, wherein the top row shows the original image and the bottom row shows the transformed image.
Figure 10:
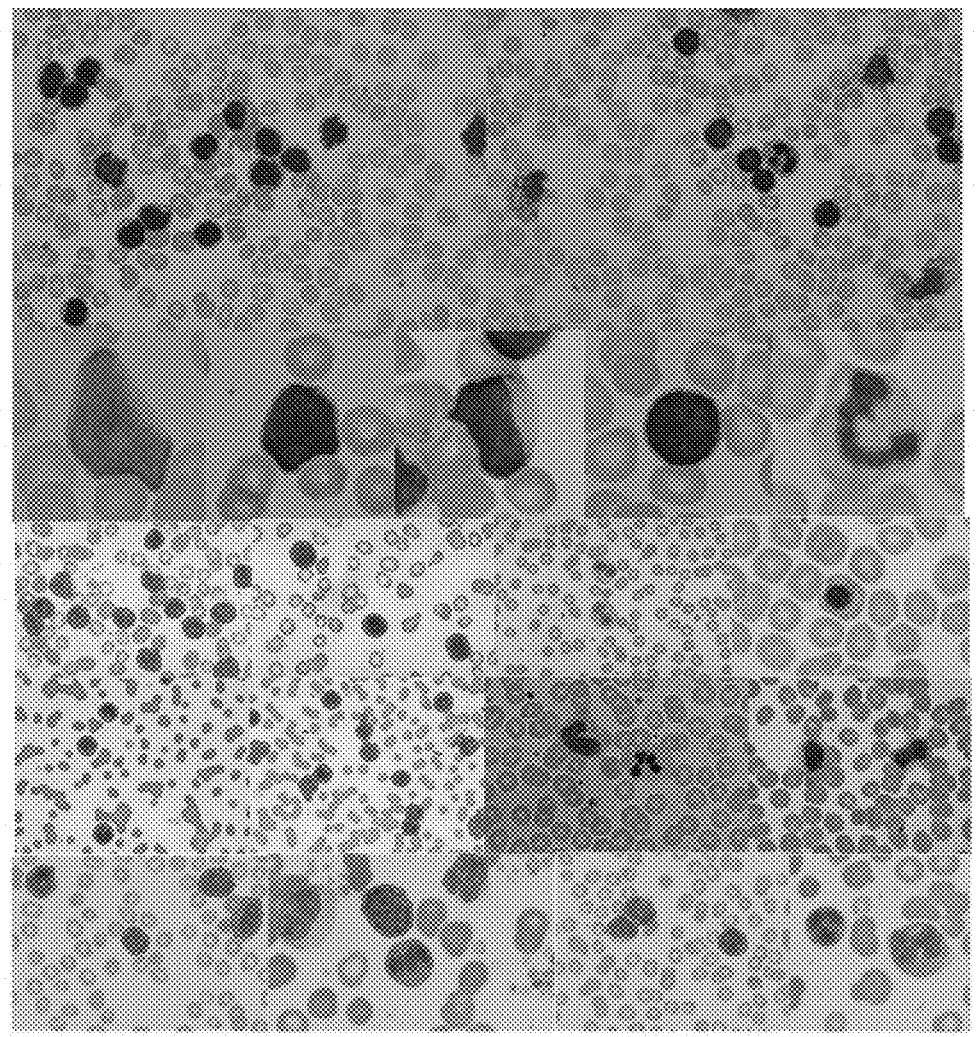
FIG. 10 shows the results of segmentation on multiple examples of blood cell images, according to one embodiment of the method of the present invention.
Figure 11:
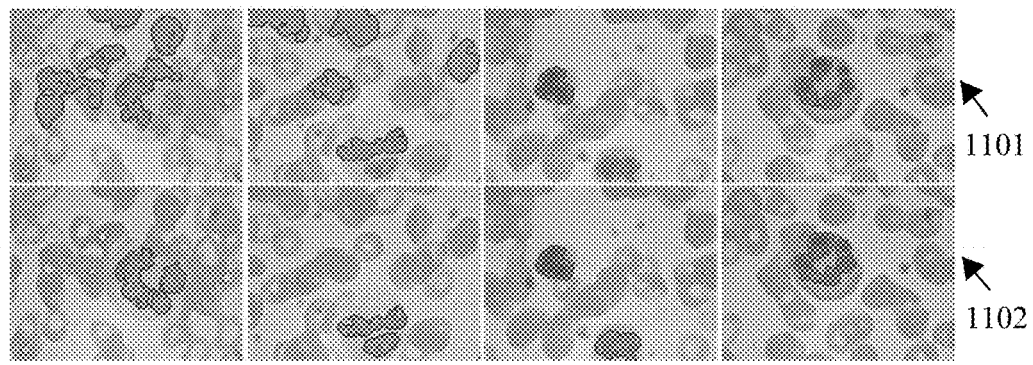
FIG. 11 shows examples of cell segmentation according to prior art techniques (top row) and the segmentation method of the present invention (bottom row).
Figure 12:
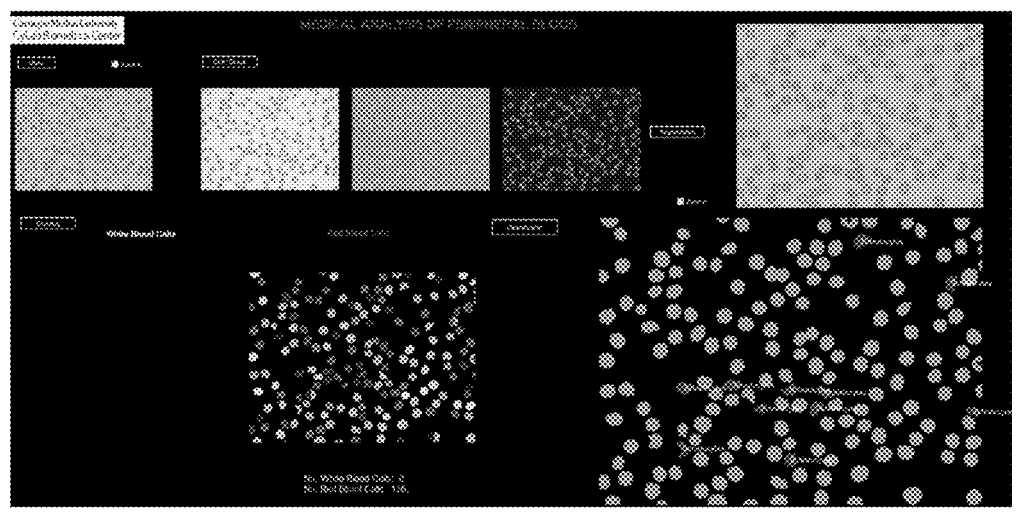
FIG. 12 shows the detection and classification of abnormal red blood cells—schistocytes—as an output of a system according to one embodiment.
Figure 13:
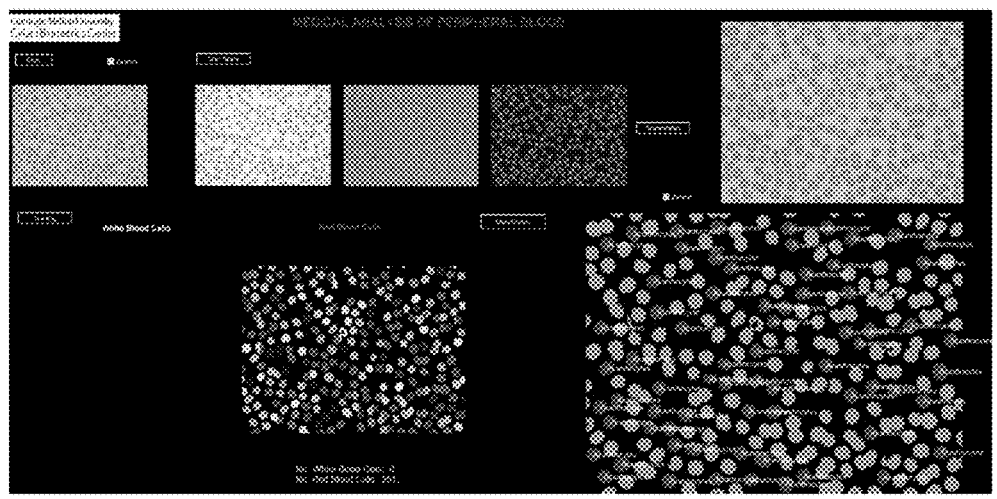
FIG. 13 shows the detection and classification of acanthocytes as an output of the system.
Figure 14:
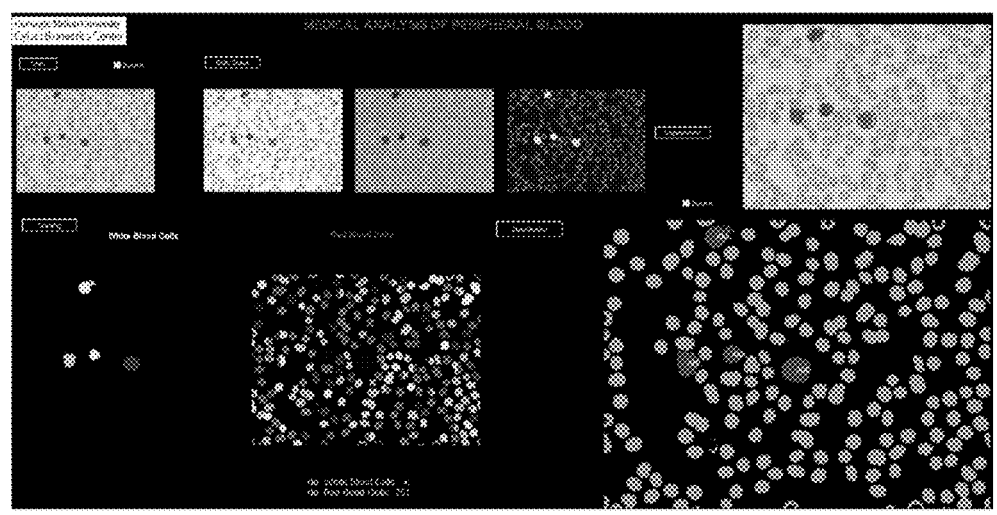
FIG. 14 shows the detection and classification of acute myeloid leukemia as an output of the system.

Some examples of cell segmentation results are shown in FIG. 7. As seen in the images in the bottom column of FIG. 7, individual cells, as well as the nucleus of white blood cells, are isolated from other cells and the background. FIG. 10 shows similar results of the segmentation step for a different set of images. FIG. 11 compares the results of the segmentation step of the present invention in row 1102 (bottom row) and the current state-of-the-art in row 1101 (top row), which is based on gray scale contrast enhancement and filtering. As seen in FIG. 11, the nuclei of the white blood cells are poorly defined or missed all together in row 1101.

Feature extraction is used throughout the method of the present invention. Intuitively, features related to shape information, color, and texture feature of blood cells are ideal for classification of such cells. In addition, these features should be rotation and scale invariant, to make the system robust in real-world scenarios. That is, features should not be dependent on how the cells are presented or captured in the image.

Regarding shape identification, Fourier Descriptors are used. The Fourier Descriptor are Fourier transforms of the Centroid Contour Distance curve, which measures the distances from the blood cell boundary to the centroid.

To begin the shape identification process, the Hu geometric moments that are invariant to rotation and scale are used. The central moments is defined as $$M_{ij} = \sum_{x,y} x^i y^j I(x, y),$$

where I is the blood cell image under consideration. The translation invariant is defined as $$\mu_{pq} = \sum_{m=1}^{p} \sum_{n=1}^{q} \binom{p}{m}\binom{q}{n}(-\bar{x})^{(p-m)}(-\bar{y})^{(q-n)} M_{mn},$$

where $$\bar{x} = \frac{M_{10}}{M_{00}}, \bar{y} = \frac{M_{01}}{M_{00}} \text{ and } \binom{p}{m} = \frac{p!}{m!(p-m)!}.$$

The scale invariant is defined as $$\eta_{pq} = \mu_{00}^{-(1+\frac{p+q}{2})} \mu_{pq}.$$

The rotation invariant is defined as $$\theta = \frac{1}{2} \arctan\left(\frac{2\mu_{11}}{\mu_{20} - \mu_{02}}\right).$$

As the next step of the shape identification process, the Zernike orthogonal moments are used to extract the shape features of blood cells. This method uses a set of complex polynomials, which form a complete orthogonal set over the interior of the unit circle $x^2+y^2=1$. The form of these polynomials is $V_{pq}(r,\theta) = R_{pq}(r)e^{jq\theta}$ where p is a non-negative integer, q is positive and negative integers subject to constraints $p-|q|$ even and $|q| \leq p$, r is the length of vector from the origin to the pixel (x, y), $\theta$ is the angle between vector r and x axis in count-clockwise direction. $R_{pq}(r)$ is the radial polynomial defined as, $$R_{pq}(r) = \sum_{s=0}^{(p-|q|)/2} \frac{(-1)^s[(p-s)!]r^{p-2s}}{s!\left(\frac{p-|q|}{2}-s\right)!\left(\frac{p+|q|}{2}-s\right)!}.$$

These polynomials are orthogonal and satisfied the orthogonality principle as follows:

$$V_{nm}^*(x, y).V_{pq}(x, y)dxdy = \frac{\pi}{n+1}\delta_{np}\delta_{mq} \text{ where}$$

$$\delta_{ab} = \begin{cases} 1 & a = b \\ 0 & a \neq b \end{cases} \text{ and } x^2 + y^2 = 1$$

Zernike moments are the projection of the image function onto these orthogonal basis functions. The Zernike moment of order p with repetition q for a continuous image function $f(x,y)$ that vanishes outside the unit circle is $$Z_{pq} = \frac{p+1}{\pi} f(x, y) V_{pq}^*(r, \theta)dxdy,$$

where $x^2+y^2<1$. For a digital image, the integrals are replaced by summations:

$$Z_{pq} = \frac{p+1}{\pi} \sum_{x,y} f(x, y)V_{pq}^*(r, \theta)$$

where $x^2+y^2<1$. The shape identification will be stored in the feature vector and used in connection with the other feature calculations to characterize a particular cell. During feature extraction, the entire image, image regions, blood cells, and other components are represented as a feature vector. The vector is then used in the training phase to create the model (or hyperplane) or in the testing phase in order to identify the type of blood cell.

In addition to extracting the shape features for segmented blood cells, four different types of textures from a given blood cell are extracted. The texture features include color features with $x^2$-histogram and Quaratic x histogram, 2D directional Gabor features, Histogram of Oriented Gradient (HOG), Scale Invariant Feature Transform, (SIFT), Haralick's texture, Tamura's texture, and Non-subsampled Contourlet Transform features.

To extract texture features, first a new histogram distance family, the Quadratic-Chi (QC), is used. QC members are Quadratic-Form distances with a cross-bin 2-like normalization. The cross-bin 2-like normalization reduces the effect of large bins having undue influence in the overall extraction process. In many instances, normalization is helpful, with a 2 histogram distance outperforming a L2 norm. QC utilizes two new cross bin histogram distance properties: Similarity-Matrix-Quantization-Invariance and Sparseness-Invariance, which can boost performance of the texture extraction process. QC distances computation time complexity is linear in the number of non-zero entries in the bin-similarity matrix and histograms and it can easily be parallelized.

As the next step of the texture extraction process, 2D directional Gabor filters of varying size, frequency, and orientation are used to filter the regions of extracted blood cells and use these filter responses in both the real and imaginary components as features to match an unseen probe blood cell image to a blood cell image in the given gallery. The Gabor filter is defined as a product between Gaussian function $$f(x, y) = \frac{1}{2\pi\sigma_x\sigma_y} \exp\left(\frac{-(x-\mu_x)^2}{2\sigma_x^2} - \frac{(y-\mu_y)^2}{2\sigma_y^2}\right)$$

and complex exponential sinusoid function $s(x,y)=\exp(j2\pi(u_0 x+v_0 y))$ where $\mu_x, \mu_y, \sigma_x, \sigma_x$ define the respective means and standard deviations along each corresponding x and y directions and $$K = \frac{1}{2\pi\sigma_x\sigma_y}.$$

The Gabor filter in spatial domain is defined as $$g(R_1, R_2 | \sigma_x, \sigma_y, \lambda, \theta) = s \times f = K\exp\left(\frac{-R_1^2}{2\sigma_x^2} - \frac{R_2^2}{2\sigma_y^2}\right)\exp\left(j2\pi\frac{1}{\lambda}R_1\right),$$

includes two separated components (real and imaginary) and is defined as shown in, in which λ is the wavelength of the sinusoidal factor, θ is the orientation of the normal to the parallel stripes of a Gabor filter, $R_1=(x-\mu_x)\cos\theta+(y-\mu_y)\sin\theta$, $R_2=-(x-\mu_x)\sin\theta+(y-\mu_y)\cos\theta$ and.

Next, Histogram of Oriented Gradient (HOG) descriptor which counts the number of occurrences of gradient orientation in a subimage (a localized portion of an image) is utilized. For each region (subimage), the gradient is first extracted by edge detection algorithms that are known to a person having ordinary skill in the art. For example, in one algorithm, the gradient magnitude $m=\sqrt{G_x^2+G_y^2}$ and orientation $$\theta = \arctan\left(\frac{G_y}{G_x}\right)$$

are computed, where $G_x$ and $G_y$ are gradient (first derivative) along x and y directions. The histograms of edge gradients with different orientations (8 orientations in the preferred embodiment) are then calculated from each subimage. In addition to HOG, Scale Invariant Feature Transform (SIFT) descriptor is another feature which also makes use of edge and orientation information. SIFT descriptor computes the histogram of orientation around a key point which found by a detector (SIFT detector, Harris detector). Each point is weighted by a Gaussian function. Coordinates of descriptors and orientations rotated to keypoint orientation to achieve rotation invariance of the descriptor.

In the next step of the texture feature extraction, the entropy of the image can be computed by a texture feature defined as a gray level co-occurrence matrix. The element (i, j) of the co-occurrence matrix Md is the number of occurrences of pixels whose gray levels are i and j, respectively and the distance between them is d, (|i−j|=d). Tamura texture features consider three aspects of contrast (intensity different among neighboring pixels), coarseness (distances of notable spatial variations of gray-level implicating the size of texels (primitive elements) forming the texture), directionality (frequency distribution of oriented local edges against their directional angles), linelikeness (an average coincidence of the edge direction that co-occurred in the pairs whose distance is d), regularity (standard deviation of the feature in subimage) and roughness (sum of coarseness and contrast measures).

As a last step, the Non-subsampled Contourlet Transform, which is defined as a fully shift-invariant, multi-scale, and multi-directional transform is applied. It is constructed using a Non-subsampled Pyramid (NSP), responsible for the multi-scale information, and the Non-subsampled Directional Filter Bank (NSDFB), which is responsible for conducting the directional information. Given a segmented blood cell image $I_i$ represented at the i-th level, $1 \leq i \leq J$, where J is the highest maximum level of the decomposition, $I_i$ is divided into a sub-band $I_i^{(L)}$ and $I_i^{(H)}$ by using the NSP equipped with a low-pass filter $H^{(L)}$ and a high-pass filter $H^{(H)}$ as shown in follows, in which * is the convolution operator. $I_i^{(L)}=H^{(L)}*I_i$ and $I_i^{(H)}=H^{(H)}I_i$, The high-pass sub-band $I_i^{(H)}$ is then decomposed into directional sub-bands by using the NSDFB, which is constructed in cascades comprising of parallelogram filters and two-channel fan filter banks. The low-pass sub-band $I_i^{(L)}$ is in turn used for the next decomposition. The procedure is in turn applied to the low-pass sub-band to obtain the next level decomposition. Generally, the decomposition procedure of NSCT is formulated as shown in $NSCT(I)=(I_j^0; (I_{i;k})_{i;k})$ in which I is the given image, $I_j^0$ is the low-pass sub-band and $(I_{i;k})_{i;k}$ are directional sub-band coefficients.

The features extracted from the image are then used to classify each cell in the image at step 400. Referring to FIG. 18, the classification step 400 is comprised of characterizing the cells based on features such as shape, color, size, or quality of the nucleus, to name a few, at step 401; next, the characterization of a cell is compared to the characterization of a reference cell at step 402; in turn, a cell is classified based on the comparison at step 403.

There are a plethora of pattern recognition algorithms to employ to biometrically model and classify blood cells. Those skilled in the art will recognize that many such classifications systems could be used in the present invention, including but not limited to Linear Discriminant Analysis (LDA), Kernel Discriminant Analysis (KDA), Neighborhood Preserving Embedding (NPE), Orthogonal Linear Graph Embedding (OLGE), Unsupervised Discriminant Projection (UDP), Marginal Fisher Analysis (MFA), Locality Preserving Projection (LPP), Local Fisher Discriminant Analysis (LFDA), Convolutional Neural Network (CNN), Support Vector Machine (SVD), Kernel Correlation Feature Analysis (KCFA), and our new development, Sparse Class Dependent Feature Analysis (SCFA). A brief description of the pattern recognition algorithms is as follows:

LDA: aims at minimizing intra-class separation while simultaneously maximizing inter-class separation. In other words, LDA minimizes the within class scatter while between class scatter is maximized. Given a set of n samples $x_j$ of classes with $n_i$ samples from $i^{th}$ class with class label $y_i$, the within class scatter matrix $$S_w = \frac{1}{2} \sum_{i,j=1}^{n} A_{i,j}^w (x_i - x_j)(x_i - x_j)^T$$

and the between class scatter matrix $$S_b = \frac{1}{2} \sum_{i,j=1}^{n} A_{i,j}^b (x_i - x_j)(x_i - x_j)^T,$$

where $A_{i,j}^w = \begin{cases} 1/n_c & (y_i = y_j = c) \\ 0 & (y_i \neq y_j) \end{cases}$ and $A_{i,j}^b = \begin{cases} 1/n - 1/n_c & (y_i = y_j = c) \\ 1/n & (y_i \neq y_j) \end{cases}$ The optimal solution which is found by solving the LDA criterion is $$\varphi = \arg\max_{\varphi} \left( tr \frac{\varphi^T S_b \varphi}{\varphi^T S_w \varphi} \right).$$

LPP: aims at decreasing the distance between nearby samples in the original space and does not take between class separability into account. In this method, the locality matrix $$S_l = \frac{1}{2} \sum_{i,j=1}^{n} A_{i,j}^l (x_i - x_j)(x_i - x_j)^T,$$

where $A_{i,j}^l = \exp(-\|x_i - x_j\|^2)$. The LPP objective function is defined as $$\min_{\varphi} (tr(\varphi^T S_l \varphi)) \text{ s.t. } \varphi^T X D X^T \varphi = I,$$

where D is an n-dimensional diagonal matrix with its $i^{th}$ diagonal element defined as $$D_{i,i} = \sum_{j=1}^{n} A_{i,j}^l.$$

LFDA: aims to maximize the between-class separability while within class multimodality is preserved. The method is qualified by three critical conditions: nearby samples in the same class are made close, far apart samples in the same class are separated, and samples in different classes are separated. In this method, the local within-class scatter matrix $$\tilde{S}_w = \frac{1}{2} \sum_{i,j=1}^{n} \tilde{A}_{i,j}^w (x_i - x_j)(x_i - x_j)^T$$

and the local between class scatter matrix $$\tilde{S}_b = \frac{1}{2} \sum_{i,j=1}^{n} \tilde{A}_{i,j}^w (x_i - x_j)(x_i - x_j)^T,$$

where $\tilde{A}_{i,j}^w = \begin{cases} A_{i,j}^l / n_c & (y_i = y_j = c) \\ 0 & (y_i \neq y_j) \end{cases}$ and $\tilde{A}_{i,j}^b = \begin{cases} A_{i,j}^l (1/n - 1/n_c) & (y_i = y_j = c) \\ 1/n & (y_i \neq y_j) \end{cases}.$ The solution to the optimization problem $$\varphi^* = \arg\max_{\varphi} \left( tr \frac{\varphi^T \tilde{S}_b \varphi}{\varphi^T \tilde{S}_w \varphi} \right)$$

is $\tilde{S}_b \varphi = \lambda \tilde{S}_w \varphi$.

SVM: aim to compute a hyper-plane in the feature space with a decision boundary $w^T x + c = 0$ that maximizes the margin $$\frac{2}{\|w\|}$$

between the training samples of each class (denoted demarcated by the lines $w^T x + c = -1$ and $w^T x + c = +1$). The constrained maximum margin can be derived and reformulated as a constrained convex optimization problem:

$$\min_{w,c} \frac{1}{2} w^T w$$

s.t $y_i(w^T x_i + c) \geq 1$. The primal optimization problem in the above equation for the linearly separable SVM can be redefined with its dual equivalent optimization problem as $$\min_{\alpha} \frac{1}{2} \alpha \times \text{diag}(y) \times K \times \text{diag}(y) \times \alpha - e \times \alpha$$

s.t. $\alpha_i > 0 \forall i \in [1,N]$ and $y^T \alpha = 0$, where K is the kernel $[K_{i,j}] = [\varphi(x_i) \cdot \varphi(x_j)]$ where $\varphi(x_i) = x_i$ for linear SVM, e is a vector of ones 1, and diag(y) is a diagonal matrix with y on its diagonal. In kernel SVM, the function $\varphi$ is defined such that it maps the data into a higher dimensional space where a SVM linear decision boundary is computed. When this linear decision boundary is mapped back into its original feature space, this boundary is distinctly non-linear.

KCFA: The correlation output of test image y with filter h: $y^+ h = y^+ [T^{-1} X (X^+ T^{-1} X)^{-1} u]$ or $y^+ h = ((\tilde{y}^+ \tilde{X}))((\tilde{X})^+ \tilde{X})^{-1} u$ where $h=T^{-1}X(X^+T^{-1}X)^{-1}u$, $\tilde{X}=T^{-1/2}X$ and $\tilde{Y}=T^{-1/2}y$ denote the pre-whitened version of X and y. Using the kernel trick yields the kernel correlation filter with mapping:

$$\phi(y)\cdot\phi(h)=(\phi(y)\cdot\phi(X))(\phi(X)\cdot\phi(X))^{-1}u=K(y,x_i)K(x_i,x_j)^{-1}u$$

CNN: Instead of using templates, CNN is used in order to automatically extract local feature. One CNN consists of many layers, each layer plays a feature extraction role and performs different operators such as convolutions, subsampling, pooling, full connection, etc. Similar to other NN, CNN is trained by backpropagation. Based on performance, online error backpropagation is used in general. The learning process is an iterative procedure where the weights are updated by a small step in the opposite direction of the steepest gradient $\nabla E$ at each iteration. The error function of K output is simply defined as $$E_p = \frac{1}{2}\sum_{k=1}^{K}(o_{pk}-t_{pk})^2,$$

where o and t are output of neuron and target value, respectively. More productive, the error can defined by cross-entropy. The weight updating rule from neuron i to neuron j in the layer l is $$w_{ij}^l \leftarrow w_{ij}^l + \lambda\frac{\partial E_p}{\partial w_{ij}^l}.$$

The hidden units use tan h active function and the outputs use the softmax function.

SCFA: While the foregoing approaches can provide fairly accurate results, a novel approach named Sparse Class-dependent Feature Analysis (SCFA) is used in the preferred embodiment of the present invention. SCFA is used to combine the advantages of sparse representation in an over complete dictionary (K-SVD for instance), with a powerful non-linear classifier. The classifier is based on the estimation of class-specific optimal filters, by solving an L1-norm optimization problem which is solved using the Alternating Direction Method of Multipliers (ADMM). In ADMM, the system solves $$\min_h \frac{1}{2}\|\tilde{X}^T h - u\|_2^2 + \lambda\|z\|_1$$

s.t $Fh-z=0$ instead of using LASSO solver $$\min_h \frac{1}{2}\|\tilde{X}^T h - u\|_2^2 + \lambda\|Fh\|_1.$$

The corresponding augmented Lagrangian form is $L_\rho(h,z,y) = \min_h \frac{1}{2}\|\tilde{X}^T h - u\|_2^2 + \lambda\|z\|_1 + \rho y^T(Fh-z) + \frac{\rho}{2}\|Fh-z\|^2,$ where y is the augmented Lagrange multiplier and $\rho>0$.

Figure 6:
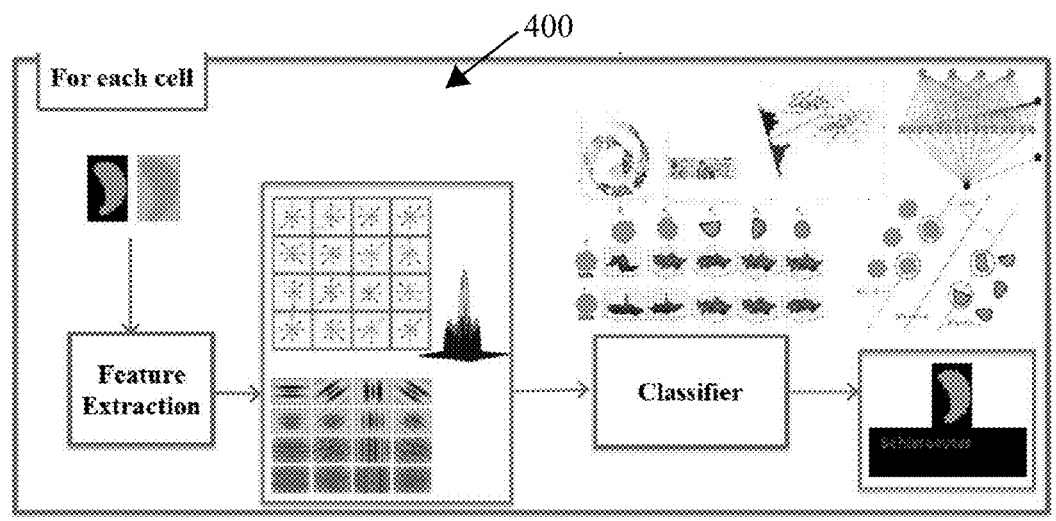
FIG. 6 is a flowchart showing the classification step of the method of one embodiment of the present invention.
Figure 8:
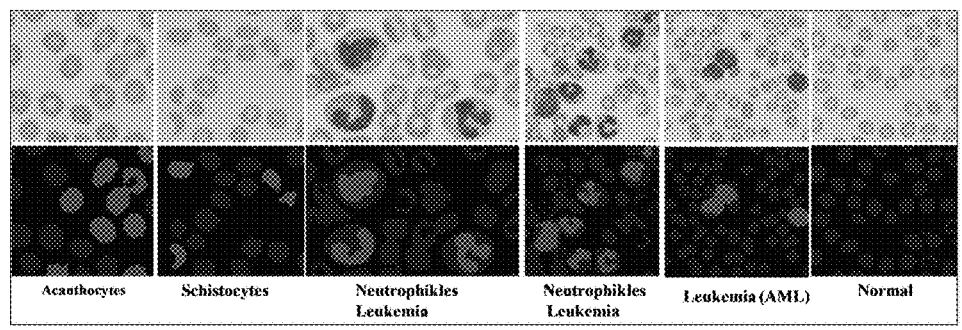
FIG. 8 depicts the results of the classification step, wherein the top row shows the original image and the bottom row shows the transformed image, with certain cells labelled as abnormal.

FIG. 6 shows a graphical representation of the proposed blood cell classification process. Examples of blood cell classification, with various abnormal cells positively identified among a group of normal cells, are shown in FIG. 8.

Figure 19:
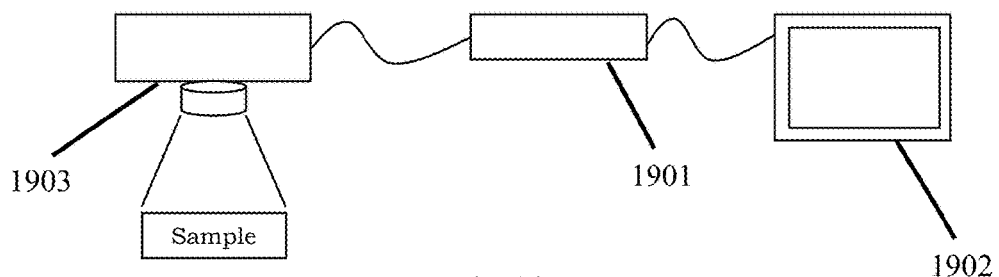
FIG. 19 is a block diagram of a system of the present invention.

The foregoing has described various embodiments of the method of the present invention. A representation of the system embodying these methods is shown in FIGS. 12-14 and 19. Referring to FIG. 19, in the preferred system, the process steps thus described will be carried-out by a computer 1901 or other processor capable of executing software performing the feature extraction and modeling steps. The system will present a visual representation of the transformed image on a display 1902, with abnormal cells or other regions of interest highlighted for further analysis by a trained pathologist. FIG. 19 further shows an image capture device 1903 that generates an image and sends the image data to computer 1901.

Alternatively, the results of the classification step can be presented in a report. Unlike a visual classification performed by a pathologist, the result can further include a quantitative assessment. For example, the report can indicate that the nucleus of a white blood cell occupies 63% of the cell, which is near a threshold for positively identifying a disease. With this level of analysis, a person who is borderline sick can schedule follow-up visits to ensure an abnormality has not progressed to a full-blown disease.

Those skilled in the art will recognize that the use of the described methods and systems to classify cells can be readily used as a tool for disease diagnostics with other types of cells. Given the machine learning aspects of the invention, the color space, feature extraction, and classification processes can be adapted to other types of cells with an appropriate learning dataset.

While the disclosure has been described in detail and with reference to specific embodiments thereof, it will be apparent to one skilled in the art that various changes and modifications can be made therein without departing from the spirit and scope of the embodiments presented. Thus, it is intended that the present disclosure cover the modifications and variations of this disclosure provided they come within the scope of the appended claims and their equivalents.

What is claimed is:

1. A method of classifying a blood cell among a plurality of blood cells in an image, the method comprising:
   extracting image data from an image of a plurality of blood cells;
   partitioning the image into a set of distinct regions, wherein a first region of the set of distinct regions contains similar pixels;
   identifying a feature set from the first region, wherein the feature set is based on the image data;
   defining a cell color space for the first region, wherein the color space is derived from at least one color modeling technique;
   optimizing the color space by using a training dataset applied in a machine learning process;
   transforming the image using the optimized color space;
   partitioning the transformed image into a second set of distinct regions, wherein a second region of the second set of distinct regions contains similar pixels;
   extracting features from the second region to create a feature vector, wherein the feature vector is based on transformed image data;
   detecting whether a white blood cell is present in the second region;
   performing at least one iteration of segmentation;
   creating segmentation of individual cells based on the iterations of segmentation;

classifying individual cells based on the feature vector, wherein the feature vector is compared to a reference feature vector created from a group of reference cells.

2. The method of claim 1, wherein the machine learning process is a free dictionary learning technique.

3. The method of claim 1, wherein performing at least one iteration of segmentation is repeated until an energy is minimized.

4. The method of claim 1, wherein the features comprise at least one of a shape, color, and texture of the individual cells.

5. The method of claim 1, wherein classifying individual cells is accomplished by executing a sparse class-dependent feature analysis algorithm on the feature vector.

* * * * *